Patented Feb. 15, 1938

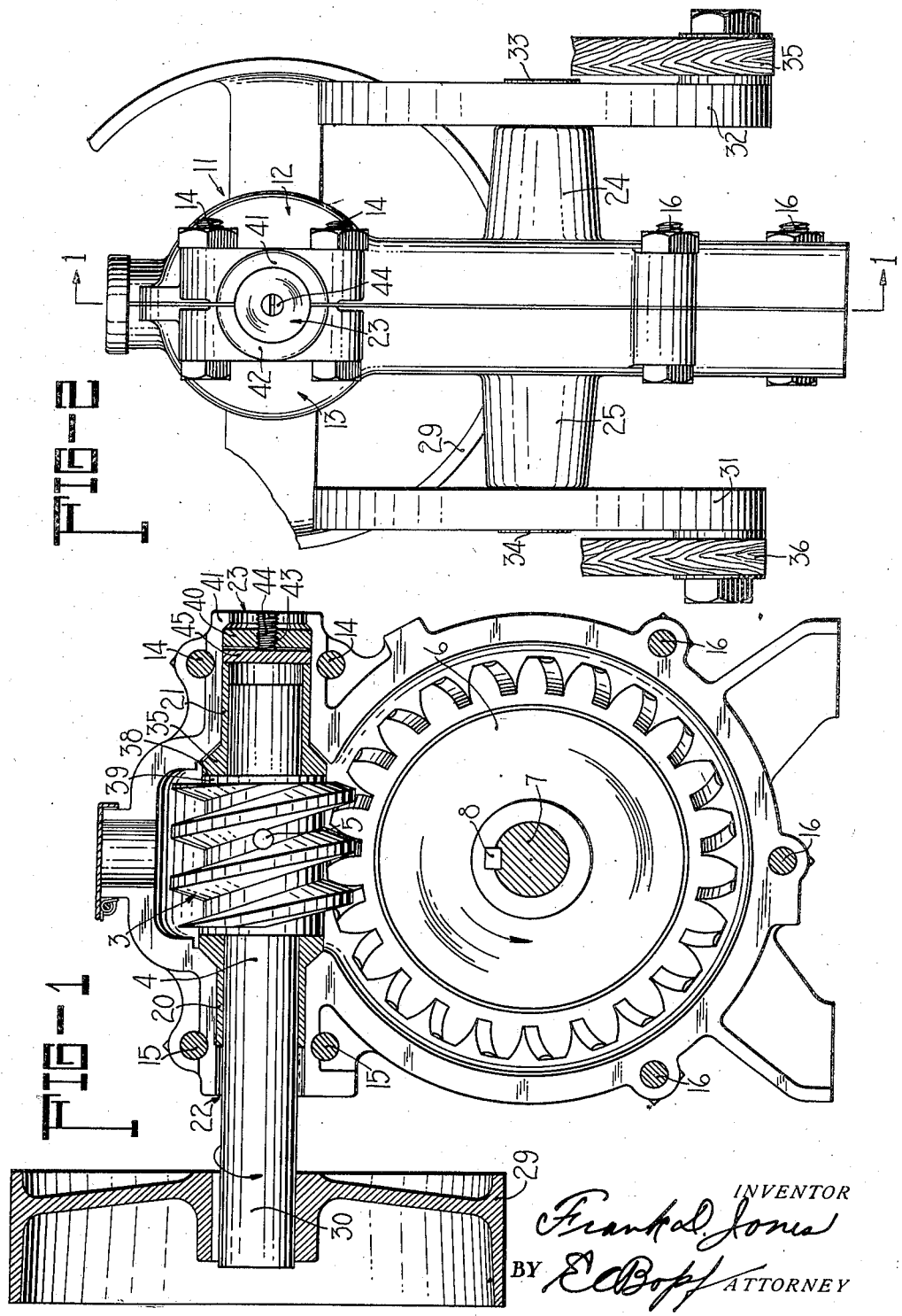

2,108,262

UNITED STATES PATENT OFFICE 2,108,262

WORM AND WORM GEAR ASSEMBLY

Frank D. Jones, Ottumwa, Iowa, assignor to Dain Manufacturing Company of Iowa, Ottumwa, Iowa, a corporation of Iowa Application November 3, 1933, Serial No. 696,526

3 Claims. (Cl. 308—166)

My invention relates in general to worm and worm gear assemblies such as are used, for example, in pump jacks for converting relatively high speed rotary motion into slower speed reciprocatory motion, and more particularly to a worm and worm gear assembly of the type in which the worm is fixed to a shaft journaled in a bearing provided with means for resisting the end thrust of the worm.

The object of my invention is to provide improved means, in a worm and worm gear of the above type, for periodically adjusting the longitudinal position of the thrust bearing and for locking the bearing in any position of adjustment. A preferred embodiment of my invention is described in the following specification in connection with the accompanying drawing in which:

Figure 1 is a vertical cross-sectional view of the assembly through the center of the housing longitudinally of the shaft upon which the worm is mounted. This cross-sectional view is taken on the line 1—1 of Figure 2; and, Figure 2 is an end view of the assembly looking in the direction of the axis of the shaft upon which the worm is mounted.

The assembly comprises a worm 3 pinned to a shaft 4 by means of a pin 5, and a worm gear 6 keyed to shaft 7 by means of a key 8. The assembly is enclosed in a housing 11 comprising two opposing half sections 12 and 13 clamped together by means of bolts 14, 15 and 16.

Shaft 4 is journaled in a bearing 20 disposed on one side of the worm 3 and a bearing 21 disposed on the opposite side of the worm 3. Bearings 20 and 21 are disposed in bearing openings 22 and 23 formed by opposing semi-cylindrical recesses provided in the two housing sections 12 and 13, respectively. Shaft 7 is journaled in bearings disposed in laterally extending bosses 24 and 25 formed integral with the housing sections 12 and 13, respectively. Shafts 4 and 7 are disposed relatively to each other such that worm 3 has proper driving engagement with the teeth on worm gear 6. Power is delivered to shaft 4 through a pulley 29 fixed to the outwardly projecting end 30. Crank wheels 31 and 32 are fixed to the projecting ends 33 and 34 of shaft 7. Crank wheels 31 and 32 are connected with the mechanism to be reciprocated, such as the pump rod of the pump, by means of pitmans 35 and 36 journaled on crank pins provided on the crank wheels.

With the shaft 4 being rotated in the direction shown by the arrow, worm gear 6 will be rotated in the direction shown by the arrow applied to it. Under load, worm 3 will then exert an end thrust in the direction of bearing 21. Bearing 21 has been provided with an enlarged flange 35 having a flat end face 38 contacting with the end 39 of worm 3 to resist such end thrust.

To adjust the position of bearing 21 to compensate for the wear on the surfaces 38 and 39 and also to hold and lock the bearing in adjusted position, I provide the following mechanism. An abutment member in the form of a disk 40 is disposed in the bearing opening 23 and bears against flanges 41 and 42 projecting radially into bearing opening 23, these flanges being formed integral with housings 12 and 13, respectively. Disk 40 is provided with a central threaded perforation 43 extending in the direction of the axis of shaft 4. An adjusting screw 44 is screwed into the threaded perforation 43. The end of screw 44 bears against a second disk 45 slidably disposed in bearing opening 23, which in turn abuts against the outer end of bearing 21. By turning screw 44 bearing 21 can be shifted longitudinally in bearing opening 23 to any desired position. The outer dimension of bearing 21 is made of such size relative to the internal diameter of bearing opening 23 that when bolts 14 are drawn up tightly, bearing 21 is firmly clamped in position and locked against longitudinal movement. Therefore, to longitudinally shift bearing 21 by means of adjusting screw 44, bolts 14 must first be loosened. After the position of bearing 21 has been adjusted, bolts 14 may again be drawn up to lock the bearing in its new position of adjustment.

The above described mechanism provides a very effective and positive means for adjusting bearing 21 longitudinally to compensate for wear on the surfaces 38 and 39 and for locking the bearing in any position of adjustment. The mechanism comprises a minimum number of parts of simple construction and easily manufactured, making the mechanism desirable not only because of its suitability from a standpoint of operation, but also from the standpoint of economy.

What I claim is:—

1. In a worm and worm gear assembly, a worm, a shaft upon which said worm is fixed, a housing consisting of two opposing half sections enclosing said worm and said shaft, said housing sections having opposing recesses therein forming a bearing opening, a radial bearing slidingly supported in said opening, one end of said shaft being journaled and supported in said bearing, said bearing being provided with means at one end for resisting the end thrust of said worm, a member abutting the other end of said bearing and slidably disposed in said opening, abutment means having a threaded perforation therein disposed longitudinally of said opening, a screw in said threaded perforation and bearing against said member whereby said bearing may be shifted longitudinally in said opening by adjusting said screw to take up wear upon said thrust resisting means, and means for clamping said housing sections together to lock said bearing in any position of adjustment.

2. In a worm and worm gear assembly, a worm, a shaft upon which said worm is fixed, a housing consisting of two opposing half sections enclosing said worm and said shaft, said housing sections having opposing recesses therein forming a bearing opening, a radial bearing slidingly supported in said opening, one end of said shaft being journaled and supported in said bearing, said bearing being provided with means at one end for resisting the end thrust of said worm, a member slidingly disposed in said opening and abutting the other end of said bearing, flanges on said housing sections extending into said opening adjacent one end thereof, an abutment member disposed in said opening and abutting said flanges, said abutment member having a threaded perforation therein disposed longitudinally of said opening, a screw in said threaded perforation and bearing against said first member, whereby said bearing may be shifted longitudinally in said opening by adjusting said screw to take up wear upon said thrust resisting means, and means for clamping said housing sections together to lock said bearing in any position of adjustment.

3. In a worm and worm gear assembly, a worm, a shaft upon which said worm is fixed, a housing consisting of two opposing half sections enclosing said worm and said shaft, said housing sections having opposing recesses therein forming a bearing opening, a radial bearing slidably supported in said opening, one end of said shaft being journaled and supported in said bearing, said bearing being provided with means at one end for resisting the end thrust of said worm, abutment means adjacent the opposite end of said bearing, adjusting means cooperating with said abutment means and bearing against said other end of said bearing for longitudinally shifting said bearing in said opening to take up wear upon said thrust resisting means, and means for clamping said housing sections together to lock said bearing in any position of adjustment.

FRANK D. JONES.